United States Patent
Lobee et al.

(10) Patent No.: US 8,349,342 B2
(45) Date of Patent: Jan. 8, 2013

(54) PUFFED STARCH MATERIAL

(75) Inventors: Henricus Wilhelmus Jozef Lobee, Zuilichem (NL); Hilde Van Grinderbeek, Vilvoorde (BE); Sarah Veelaert, Eppegem (BE)

(73) Assignee: Cargill, Incorporated, Wayzata, MN (US)

( * ) Notice: Subject to any disclaimer, the term of this patent is extended or adjusted under 35 U.S.C. 154(b) by 0 days.

(21) Appl. No.: 13/125,440

(22) PCT Filed: Oct. 9, 2009

(86) PCT No.: PCT/EP2009/007259
§ 371 (c)(1),
(2), (4) Date: Apr. 21, 2011

(87) PCT Pub. No.: WO2010/046038
PCT Pub. Date: Apr. 29, 2010

(65) Prior Publication Data
US 2011/0212149 A1 Sep. 1, 2011

(30) Foreign Application Priority Data
Oct. 22, 2008 (EP) .................... 08018426

(51) Int. Cl.
*A61K 8/02* (2006.01)
*A23L 1/217* (2006.01)
*A23L 1/025* (2006.01)

(52) U.S. Cl. .......... 424/401; 426/96; 426/107; 426/242

(58) Field of Classification Search .................. None
See application file for complete search history.

(56) References Cited

U.S. PATENT DOCUMENTS

| | | | |
|---|---|---|---|
| 3,620,842 A * | 11/1971 | Germino et al. ............. | 127/32 |
| 4,965,081 A * | 10/1990 | Lazarus ....................... | 426/242 |
| 5,102,679 A * | 4/1992 | Whalen ........................ | 426/549 |
| 5,132,127 A * | 7/1992 | Wisdom ....................... | 426/549 |
| 5,198,255 A * | 3/1993 | Schwab et al. ............... | 426/241 |
| 5,523,109 A * | 6/1996 | Hellweg et al. .............. | 426/618 |
| 5,750,166 A * | 5/1998 | Schellhaass ................. | 426/93 |
| 5,780,084 A * | 7/1998 | Degli Angeli et al. ........ | 426/242 |
| 6,083,552 A * | 7/2000 | Kershman et al. ........... | 426/559 |
| 6,136,365 A * | 10/2000 | Burri ............................ | 426/620 |
| 6,153,242 A * | 11/2000 | Miyamoto et al. ........... | 426/446 |
| 6,805,888 B2 * | 10/2004 | Wu ............................... | 426/93 |
| 2002/0197383 A1* | 12/2002 | Amos Wu .................... | 426/618 |
| 2003/0039735 A1* | 2/2003 | Morii et al. ................... | 426/559 |
| 2003/0083512 A1* | 5/2003 | Jakel et al. .................... | 554/10 |
| 2003/0170370 A1* | 9/2003 | Evenson et al. .............. | 426/620 |
| 2004/0028797 A1* | 2/2004 | Squire et al. ................. | 426/620 |
| 2004/0105930 A1* | 6/2004 | Morii et al. ................... | 426/559 |
| 2006/0204569 A1* | 9/2006 | Obae et al. ................... | 424/464 |
| 2007/0092616 A1* | 4/2007 | Witte et al. ................... | 426/445 |
| 2007/0141096 A1* | 6/2007 | Van Lengerich ............. | 424/401 |

FOREIGN PATENT DOCUMENTS

| | | |
|---|---|---|
| EP | 0217368 | 4/1987 |
| EP | 0657102 | 6/1995 |
| GB | 821761 | 10/1959 |

OTHER PUBLICATIONS

Molteberg et al.; Sensory and Chemical Studies of Lipid Oxidation in Raw and Heat-Treated Oat Flours; Cereal Chem. 73(5):579-587 1996; American Associate of Cereal Chemists, Inc. XP-002067654.
Mariotti et al.; Effect of puffing on ultrastructure and physical characteristics of cereal grains and flours; Journal of Cereal Science 43 (2006) 47-56. XP-005176688.

* cited by examiner

*Primary Examiner* — Robert A Wax
*Assistant Examiner* — Olga V Tcherkasskaya

(57) ABSTRACT

The present invention concerns a puffed popcorn starch containing powder having a loose bulk density of less than 120 g/L and a particle size smaller than 1 mm, a non-aqueous liquid-loaded starch material comprising said powder and a process for preparing these. In addition the present invention relates to the use of said powder as a solid carrier material for non-aqueous liquid or gaseous components and the use of said non-aqueous liquid-loaded starch material in food and animal feed products, pharmaceuticals, nutraceuticals, agrochemicals, and cosmetic or personal care products.

11 Claims, No Drawings

United States Patent US 8,349,342 B2

PUFFED STARCH MATERIAL

CROSS REFERENCE TO RELATED APPLICATIONS

This application is claims benefit of international application PCT/EP09/007,259 filed 9 Oct. 2009, which application claims priority to European application 08018426.0, filed 22 Oct. 2008, which applications are incorporated herein by reference.

FIELD OF THE INVENTION

The present invention concerns a puffed popcorn starch containing powder, a non-aqueous liquid-loaded starch material comprising said powder and a process for preparing these.

BACKGROUND OF THE INVENTION

Recently, it was reported that puffed starch material has the potential to act as carriers for the retention and absorption of liquids such as water or flavors.

Journal of Cereal Science 43 (2006) 47-56 describes the effect of puffing on ultrastructure and physical characteristics of cereal grains and flours and describes the use in food to prevent water migration.

GB 821,761 relates to the production of a precooked edible granular meal-like or floury type product from certain cereal grains namely maize, wheat, rice, oats, barley, kaffir corn and munga and provides a process for it. Cereal grains are subjected for pre-cooking to a form of puffing. It is observed that the thus obtained product has a quite exceptional moisture absorption.

EP 0657102 describes popcorn to be used as water binding material in food applications.

U.S. Pat. No. 4,096,281 and EP 0217368 describe a method and composition for producing flavoured or flavour impregnated pop corn.

Although there are various starch-based materials available in the art, which are used as carriers or encapsulating materials for liquids, solids and volatile substances, there is still a need in the industry for an additional starch containing powder having a high loading capacity for non-aqueous liquid components, which can be prepared in a simple and cost-efficient manner.

SUMMARY OF THE INVENTION

The present invention provides a puffed starch containing powder having a loose bulk density of less than 120 g/L, preferably less than 100 g/L, more preferably less than 80 g/L, characterized in that more than 90 weight % of the powder has a particle size smaller than 1 mm and the puffed starch containing powder is puffed popcorn starch containing powder. The puffed popcorn starch containing powder is preferably prepared by a process which comprises the following steps of:
  (a) Taking one or more popcorn starch containing kernels,
  (b) Generating steam inside the kernel,
  (c) Continuing step b) until the kernel expands and releases the generated steam,
  (d) Grinding the kernel to obtain a ground kernel having a particle size smaller than 1 mm, and
  (e) Optionally fractionating the ground kernel.

The invention further relates to a non-aqueous liquid-loaded starch material, comprising a solid carrier material consisting of a puffed popcorn starch containing powder of the current invention and one or more non-aqueous liquid components absorbed into and/or onto said solid carrier material.

The preferred process for preparing the non-aqueous liquid-loaded starch material comprises the following steps of:
  (a) Providing a puffed popcorn starch containing powder as previously described, and
  (b) Loading one or more non-aqueous liquid components into and/or onto the starch material provided in step (a) by applying one or more non-aqueous liquid components to the starch material under agitation.

Furthermore the current invention relates to the use of the puffed popcorn starch containing powder according to the present invention as a solid carrier material for non-aqueous liquid or gaseous components and the use in food and animal feed products, pharmaceuticals, nutraceuticals, agrochemicals, and cosmetic or personal care products.

DETAILED DESCRIPTION OF THE INVENTION

The present invention is based on the unexpected finding that a puffed popcorn starch containing powder having a loose bulk density of less than 120 g/L, preferably less than 100 g/L, more preferably less than 80 g/L and characterized in that more than 90 weight % of the powder has a particle size smaller than 1 mm and is having novel and superior functionalities, i.e. an excellent loading capacity for non-aqueous liquid components. In a further preferred embodiment the powder is having a loose bulk density of less than 60 g/L. Much lower bulk density will result in too big volumes of products versus the actual weight of the product.

The puffed popcorn starch containing powder is obtained from a puffed popcorn starch containing material wherein "puffed" refers to the well-known definition of puffing which indicates a swelling through a release of vapour in a puff. A puffed popcorn starch containing material is a swollen and/or burst kernel, which is containing starch in an amount of between 60 and 70%.

Suitable starch containing kernels refer to any type of popcorn. Certain strains of corn are now cultivated specifically as popping corn. Popping corn is a type of corn which explodes from the kernel and puffs up when heated. Also suitable are starches derived from a genetically modified starch crop.

The bulk density of a powder is the weight of the powder divided by the volume it occupies, expressed as g/L and in the method for measuring the bulk density, if no tapping is done, one refers to the loose bulk density (versus the tapped density when tapping is used in the methodology).

It was surprising to find that the puffed popcorn starch containing powder of the present invention exhibits a high loading capacity for non-aqueous liquid components like oils. The powder has an oil retention capacity of at least 50%, preferably at least 80%, more preferably at least 100% w/w based upon the powder.

The powder of the current invention is characterized in that 90 weight % of the powder has a particle size smaller than 1 mm.

More specifically it relates to a finer grade powder wherein at least 80 wt % has a particle size below 0.5 mm, preferably at least 70 wt % has a particle size below 0.3 mm.

In accordance with the present invention, a preferred process for preparing the puffed popcorn starch material described hereinabove comprises the following steps of:
  (a) Taking one or more popcorn starch containing kernels,
  (b) Generating steam inside the kernel, (c) Continuing step b) until the kernel expands and releases the generated steam, (d) Grinding the kernel to obtain a ground kernel having a particle size smaller than 1 mm, and (e) Optionally fractionating the ground kernel.

Step b) and c) of the preferred process refer to a puffing process. Puffing is the process of heating grains (kernels) resulting in an increasing vapor pressure of the water inside the grain (kernel). At certain temperature, the pressure becomes so high that it breaks the kernel with a typical popping sound.

There are two traditional types of equipments used for puffing: high temperature ovens or towers, or puffing guns.

Oven puffing is based on a sudden application of heat at atmospheric pressure so that the water in the kernel is vaporized in situ, thereby expanding the product. Suitable equipment for preparing the puffed starch containing kernel of the present invention are commercially available industrial ovens, for example conventional ovens, microwave ovens, dextrinizers, fluidized bed reactors and driers, mixers and blenders equipped with heating devices and other type of heaters, contact heating on e.g. metal surface, hot air puffing in a fluidized bed operation, turboreactors and the like. Possible heat transfer media include hot air, oil or superheated steam.

Gun puffing is based on a sudden transfer of kernels containing superheated steam from a high pressure to a low-pressure medium thereby allowing the water to suddenly vaporize and cause expansion. The advantage of the puffing gun or chamber is that they allow the puffing to be controlled and to be performed with a wide variety of kernels.

Degree of expansion of the kernel depends on the genotype, kernel size, water content of the starch containing material and/or processing conditions.

The preferred temperature is normally between 200 and 400° C. The optimum moisture content of the kernel ranges from 10 to 20%, preferably from 13 to 15%.

In a preferred embodiment of the present invention, step d) is a grinding step applied in a mill over a sieve with a 1 to 2 mm sieve opening. It may be important to have cutting effect and avoid that porous structure is being disturbed and sealed during the grinding operation and the heat generation has to be minimized as well. Optionally pre-milling step without or with a coarser sieve opening, will be beneficial to have a primary size reduction and more efficient milling. Typical mills that could be used are cross beater mills, cutting mills, impact mills. The resulting ground kernel (=puffed popcorn starch containing powder) has a certain particle size distribution, preferably with more than 90% of the weight of the material below 1 mm (passing a 1 mm sieve), and more than 70% below 0.5 mm.

Once the powder is ground (milled), it can be further fractionated (=separated) into different fractions by sieving, electrostatic separation or wind sifting. The advantage of wind-sifting obviously is that fractions with a lower bulk density can be easily isolated. With these separation steps it is also possible to remove the insoluble yellow and/or brown fibers, resulting from the pericarp of the raw material used. Especially when puffing occurs at too high temperatures these fibers are brown in nature and can be a potential disadvantage for certain applications such as milk replacement.

In another aspect, the present invention relates to a non-aqueous liquid-loaded starch material, which comprises a solid carrier material consisting of the puffed popcorn starch containing powder as defined hereinabove and one or more non-aqueous liquid components. The one or more non-aqueous liquid components are buried within, supported on, captured by, bound to, and/or absorbed into and/or onto the carrier material, which provides a matrix for the liquid components. It will be understood, that the term "comprise", as used in the present description, is meant to encompass not only the meanings "include", "contain" or "comprehend" but also the meaning of "consisting (exclusively) of".

A "non-aqueous liquid component", as used herein, refers to any matter that is present in non-aqueous liquid form and includes, for example, mixtures of different liquids and solutions or suspensions of one or more substances. Non-aqueous liquid ingredients that can be loaded include, but are not limited to, flavour compounds, aromas, fragrances, plant derived extracts, emulsifiers, colours, oils and fats, in particular those oils and fats that are usable as food ingredients or additives, such as omega-3 rich oils, salad and fish oils, essential oils and lecithin, other nutrients, such as carotenoids and vitamins like vitamins A and E, and organic acids, antioxidants, pharmaceutically active ingredients, as well as oleoresins, blood, alcoholic beverages, insect repellents, insecticides, and herbicides. Furthermore, also solutions of specific substances or ingredients, such as biologically active compounds like microorganisms or enzymes, are suitable for use herein, wherein the non-aqueous solvent, if desired, can be removed after loading by a drying step. Preferred non-aqueous liquid ingredients are alcohols, acetones, ketones, aldehydes, oils and fats. Particularly suitable for use herein are any type of oil and fat, essential oils, oleoresins, plant derived extracts, flavour and fragrance blends in carrier solvents like alcohol, propylene glycol, or vegetable oils, lecithin and polyunsaturated fatty acids.

In a preferred embodiment of the present invention, it is surprisingly found that the loading of the non-aqueous components is extremely high and is much higher (even up to 7 to 15 times higher) than any aqueous (moisture) loading. The non-aqueous liquid-loaded starch material comprises no less than 30% by weight of the one or more non-aqueous liquid components, based on the total weight of the non-aqueous liquid liquid-loaded starch particles. More preferably, the non-aqueous liquid components account for at least 40%, most preferably for at least 50%, and even more preferably for at least 75% by weight, of the non-aqueous liquid-loaded starch particles. It is surprisingly found that even at these extremely high loadings the non-aqueous liquid loaded starch material is still behaving as a free flowing powder while the carrier material has absorbed 1 to 3 times its own weight of a non-aqueous liquid component.

In a further aspect, the present invention relates to a process for preparing the non-aqueous liquid-loaded starch material as described hereinabove by applying one or more liquid components to puffed popcorn starch containing powder as described hereinabove under agitation.

For loading the puffed popcorn starch containing powder with one or more non-aqueous liquid components, the powder may be placed in a vessel supporting mechanical mixing and preferable capable of being sealed. Suitable mixing devices are, for example, a paddle mixer, a ribbon blender, a V-blender, or a plough blade mixer. The one or more non-aqueous liquid components are then supplied, for example poured, pumped or, preferably, sprayed via a nozzle, into the vessel and applied onto the agitated starch material. Spraying via a nozzle is advantageously used because the nozzle leads to the formation of small droplets that are more easily absorbed by the starch carrier material. Loading from the gas phase or under supercritical conditions is also possible. The mixing is continued until an even distribution of the liquid material into and/or onto the solid carrier is obtained. The time required for spraying or pumping is dependent upon the addition level of the non-aqueous liquid components onto the puffed popcorn starch containing powder and the time required to ensure complete absorption to form a free flowing powder.

Another suitable method for loading one or more non-aqueous liquid components onto the puffed popcorn starch containing powder of the present invention may be a fluidized-bed loading process. In such a process, the carrier, i.e. the puffed popcorn starch containing powder of the present invention, is fluidized by forcing air or another gas upward through a bed of puffed popcorn starch containing particles. The non-aqueous liquid components are then sprayed via a nozzle onto the fluidized particles to yield a non-aqueous liquid-loaded popcorn starch material of evenly loaded puffed popcorn starch containing particles.

A further suitable loading method for use herein comprises the steps of suspending the puffed popcorn starch containing carrier material of the present invention in the non-aqueous liquid components, followed by separating the non-aqueous liquid-loaded popcorn starch material from the non-aqueous liquid components by conventional separation methods, such as filtration or centrifugation.

Depending on the type of non-aqueous liquid component to be loaded, the non-aqueous liquid component may be heated or cooled. In case of high viscous liquid components, for example, it might be favourable to heat the liquid components to decrease the viscosity and facilitate the loading process. In case of temperature-sensitive liquid components, cooling might be desired or required, such as for solutions of heat-sensitive pharmaceutical active substances. Means for effecting cooling or heating, such as a cooled or heated blender, are well-known to a person skilled in the art.

In accordance with the present invention, the puffed popcorn starch containing powder used as a carrier material may be pre-treated before loading with an inert gas to remove, for instance, oxygen. It can also be vacuum-treated before loading to increase the absorption capacity. Further, when sensitive non-aqueous liquids are to be loaded, the loading operation might be carried out under an inert gas atmosphere, for example under a nitrogen atmosphere to protect against loss of quality by oxidation.

After having loaded the puffed popcorn starch containing powder with one or more non-aqueous liquid components, further processing steps may optionally follow. For example, flowing or anti-caking agents may be added to the non-aqueous liquid-loaded popcorn starch material, such as tricalcium phosphate, silica, silicates and/or stearates, to increase flowability. The non-aqueous liquid-loaded popcorn starch material of the present invention may also be provided with a coat and/or further encapsulated by any suitable encapsulating or coating materials, such as maltodextrins, starches, modified starches, dextrins, oils, fats, waxes, hydrocolloids, proteins, as known in the art.

In another aspect, the present invention concerns the use of the puffed popcorn starch containing powder according to the present invention as a carrier material for non-aqueous liquid components to protect, store, stabilize, and/or control the release property of the same. Furthermore, when bound to the popcorn starch carrier material, the non-aqueous liquid components are easier to handle, store and formulate.

The non-aqueous liquid-loaded popcorn starch material of the present invention may be incorporated into numerous different formulations, such as powders, granules, tablets, pellets, capsules, lozenges, pastes, gels, creams, salves, ointments, lotions, paper products, absorption pads, tissues, and the like. Preferred end-use applications of the non-aqueous liquid-loaded starch material of the present invention include, but are not limited to, food and animal feed products, growth promoting agents, humectants, pharmaceuticals, nutraceuticals, agrochemicals, such as herbicides, pesticides, and fertilizers, and cosmetic and personal care products, such as dry hair care products, shampoos, conditioners, antiperspirants, deodorants, mouthwashes, soaps, cosmetic creams, disposable sanitary products like diapers and the like. The puffed popcorn starch containing material can also be used as absorption medium in waste water treatment, cleaning of oil spills, clarification of liquids, gas scrubbers, pet litter, deodorization, and the like.

In a preferred embodiment of the present invention, the non-aqueous liquid-loaded starch material of the present invention is used in food products including, but not limited to, bakery products, snacks, bars, cereal mixes, meat and fish products, meat and fish analogues, dry soup mixes, instant drinks and soups, cakes and dry dessert mixes, spices, seasonings, toppings, batters, milk replacements, non-dairy creams, grated or powdered cheeses, and flavoured teas. The material can be liquid (non-aqueous) loaded before application in the final product or absorb the liquids in situ in the final product during preparation, stabilization, maturation or storage.

In another preferred embodiment the non-aqueous liquid-loaded starch material of the present invention is used in animal feed, premixes for compound feed (meal types, pellets, crumbles), concentrates or compound feed. Compound feed can be complete feeds that provide all the daily-required nutrients. Concentrates provide a part of the ration (protein, energy) or supplements that only provide additional micronutrients such as minerals and vitamins. The non-aqueous liquid-loaded starch material of the present invention can be applied in any kind of animal feed, in particular feed for piglets, calfs, fish (marine) and in pet food.

In yet another embodiment, the present invention relates to a gas-loaded material, which comprises a solid carrier material, consisting of the puffed popcorn starch containing powder as defined herein above and one or more gas components. A gas component, as used herein, refers to any matter that is present in gaseous form and includes, for example, volatile organic compounds or aroma (flavour or fragrances) compounds, pollutants (alkylhalides, greenhouse gases), agricultural chemicals, pesticides, (supercritical) $CO_2$, mixtures thereof and the like.

It is clearly demonstrated that the puffed popcorn starch containing powder having a loose bulk density of less than 120 g/L and wherein more than 90% weight % of the powder has a particle size smaller than 1 mm, is showing superior properties in respect of loadings of non-aqueous liquids. The other cereals as indicated in the examples, have a higher loose bulk density and a significant lower loading capacity.

The present invention will now be further illustrated and explained by reference to the examples given below.

EXAMPLES

Measurements

Oil Retention Capacity

The oil retention capacity was measured by centrifuging a given amount of a carrier sample in oil dispersion, removing the oil that was not bound to the powder, subjecting the remaining oil-loaded starch containing sample to high centrifugal forces and determining the amount of oil, which was retained by the starch containing sample by assessing the weight of the obtained centrifuged starch.

25 g (W0) of a starch sample was weighted and 25 g of sunflower oil (Vandemoortele, Belgium) was added and thoroughly mixed with a spoon for 2 min to give an oil-starchy mixture. In case of a too high viscosity, an additional amount of oil was added. A 750 ml round bucket centrifuge bottle was filled with about 360 g native potato starch and a folded filter paper (150 mm diameter, Machery-Nagel MN 614) was unfolded and placed on top of the potato starch (in a small hole, to ensure that the filter paper will stay in position during the subsequent centrifugation). The prepared oil-starchy mixture was then poured onto the filter paper, followed by centrifugation at 3434×g for 10 min in a Heraeus Multifuge 3S centrifuge. After completion of the centrifugation, the filter paper with the starch-oil sample was withdrawn from the centrifuge bottle, and the starch-oil sample remaining on the filter was carefully removed and the weight Ws was measured. The oil retained by the sample is calculated as Ws−W0 and the oil retention capacity (%) is expressed as (Ws−W0)/W0×100%.

Loose Bulk Density

Use a 250-ml graduated glass cylinder placed on a horizontal surface. By means of a ring stand on a ring support, position a powder funnel (Pyrex, with a 30 mm stem and an outside diameter of 17 mm) in a vertical position with the stem centered inside the cylinder, 6 cm above the 250 ml-mark. Carefully add sample to the powder funnel until the powder is filled to the 250-ml mark. Determine the weight of the content to the nearest 0.1 g.

Loose bulk density (g/ml)=loose sample weight (g)/250 ml

Particle Size Distribution

The particle size distribution was determined by a sieve analysis using sieves with different openings. The respective sieve fractions on the sieves where weighted and divided by the total weight of the starch containing powder to give a percentage retained on each sieve.

Example 1a

Preparation and Characterization of Pop Corn Flour

Popcorn kernels (butterfly type) were popped in a household microwave oven operated at 750 Watt during ±2 minutes (in small batches of about 5 grams in a glass beaker). The heating was stopped to avoid burning of the kernels.

After cooling, the popped corn was ground in a laboratory grinder IKA MF10, equipped with a 0.5, 1 or 1.5 mm sieve and a cutting grinding head MF10.1 at 5000 rpm. One part was milled over a RETSCH SR300 rotor beater mill using a sieve of 1 mm.

The oil retention capacity was measured with sunflower oil according to the described method.

| Sample | Sieve (mm openings) | % oil retention of the pop corn flour |
|---|---|---|
| 1 | 1.5 (1) | 82 |
| 2 | 1.0 (1) | 81 |
| 3 | 0.5 (1) | 62 |
| 4 | 1.0 (2) | 105 |

The loose bulk density for sample 4 is 99.6 g/l

Example 1b

Preparation and Characterization of Pop Corn Flour

The puffed popcorn was prepared as in example 1a. Milling was performed in two steps on a RETSCH SR300 rotor beater mill. The first step was a pre-milling step without use of a sieve. The second step was milling over a sieve with resp. a sieve opening of 1.5, 2 and 3 mm.

The oil retention capacity was measured with sunflower oil according to the described method.

| Sample | Sieve (mm openings) | % oil retention of the pop corn flour | Wt fraction % <1 mm |
|---|---|---|---|
| 5 | 1.5 (3) | 91 | 99 |
| 6 | 2.0 (3) | 94 | 96 |
| 7 | 3.0 (3) | 67 | 66 |

Example 2

Loading of Pop Corn Flour with Lemon Flavor 30 ml of lemon flavor (lemon block U9876, Cargill, The Netherlands) was poured on top of 10 g of the pop corn flour (sample 4 in example 1) in a beaker and it was mixed with a spoon. The lemon flavor was completely absorbed.

The same test was repeated with ethyleneglycol and ethanol, with the same loading capacity.

Example 3

Loading of Pop Corn Flour with Fat 300 g coconut fat (Cargill, The Netherlands) was heated to 50° C. The warm coconut oil was sprayed on 100 g of pop corn flour in a Hobart mixer while stirring. Stirring was continued for 5 minutes, until a homogenous mixture was obtained. The resulting powder looked completely dry and did not have a fat-like appearance.

Example 4

Pilot Trial

Pop corn was puffed in a conventional hot air popping equipment, without the addition of oil, sugar, flavors or other additives. 20 kg of this puffed material was ground in a Bauermeister Universall mill (UTL) with a sieve opening of 1 mm. The resulting powder had a loose bulk density of 48 g/L and more than 95 wt % of the material has a particle size below 1 mm. A blend of coconut and palm oil was heated to 50° C. and loaded on the popcorn flour in a plough blade Lödige mixer. Samples were prepared with 65 and 75% w/w added fat content. Both samples behaved as a dry powder. The bulk density of the loaded samples was 130 and 180 g/L (loose), respectively.

Example 5

Storage Test

A solid fat composition obtained as described in example 4 with an oil content of 75% was stored under pressure to simulate storage conditions in a 4 meter silo. The sample was not compressed and oil was retained by the carrier (it was not pressed out).

Example 6

Removal of Fibers by Wind Sifting

A pop corn flour was prepared as described in example 4. The flour was fed into a self-made zig-zag air classifier for separation into a light and heavy fraction. The heavy fraction of the first run was fed a second time to the air classifier to separate the brown fiber fraction.

|  | Loose Bulk density (g/L) | Oil retention (%) w/w |
|---|---|---|
| Whole popped corn flour | 55.0 | 102.0 |
| Light fraction | 44.2 | 136.8 |
| Heavy fraction | 77.6 | 84.8 |
| Fibers + grits | 380 | 12.0 |

Removal of fibers clearly resulted in a whiter powder, more homogeneous in composition. Most of the darker particles (brown-yellow fibers) were removed with the heavy fraction. The particle size distribution was not highly affected, but slightly shifted towards smaller particles. Besides the removal of the brown fiber fractions, the interest of wind sifting is the effect of isolating the fraction with a significantly lower bulk density, characterized by a much higher oil absorption capacity.

Example 7

Comparison with Different Types of Starch

The puffed grains were prepared according to the method of example 1a. The puffed cereals were milled in a laboratory grinder IKA MF10, equipped with a 1.5 mm sieve and a cutting grinder head MF10.1 at 5000 rpm. The oil retention capacity was measured with sunflower oil according to the described method. Furthermore also the loose density was measured for each of the puffed grains:

|  | Loose Bulk density (g/L) | Oil retention (%) w/w |
|---|---|---|
| Puffed kamut | 263 |  |
| Puffed rice | 149 | 39 |
| Puffed wheat (Sainsbury) | 304 |  |
| Puffed oat | 222 | 31 |
| Puffed corn flour | 143 | 36 |
| Puffed barley | 224 | 25 |

The high loose bulk density of the different puffed grains result in a low oil retention.

The invention claimed is:

1. A puffed starch containing powder having a loose bulk density of less than 120 g/L, wherein more than 90 weight % of the powder has a particle size smaller than 1 mm, wherein the puffed starch containing powder is puffed popcorn starch containing powder, and wherein the puffed popcorn starch containing powder has an oil retention capacity of at least 50% based upon the powder.

2. A process for preparing a puffed popcorn starch containing powder according to claim 1, comprising the steps of:
   (a) Taking one or more popcorn starch containing kernels,
   (b) Generating steam inside the kernel,
   (c) Continuing the steam-generating step until the kernel expands and releases the generated steam,
   (d) Grinding the kernel to obtain a ground kernel having a particle size smaller than 1 mm.

3. A process for preparing a puffed popcorn starch containing powder according to claim 1, comprising the steps of:
   (a) Taking one or more popcorn starch containing kernels,
   (b) Generating steam inside the kernel,
   (c) Continuing the steam-generating step until the kernel expands and releases the generated steam,
   (d) Grinding the kernel to obtain a ground kernel having a particle size smaller than 1 mm, and
   (e) Fractionating the ground kernel.

4. A non-aqueous liquid-loaded starch material, comprising a solid carrier material consisting of a puffed popcorn starch containing powder according to claim 1 and one or more non-aqueous liquid components absorbed into and/or onto said solid carrier material.

5. The liquid-loaded starch material of claim 4, wherein the one or more non-aqueous liquid components absorbed into and/or onto the solid carrier material constitute at least 30% by weight of the total weight of the liquid-loaded starch particles.

6. A process for preparing a liquid-loaded starch material according to claim 4, comprising the steps of:
   (a) Providing a puffed popcorn starch containing powder prepared by a process having the steps of (i) taking one or more popcorn starch containing kernels, (ii) generating steam inside the kernel, (iii) continuing the steam-generating step until the kernel expands and releases the generated steam, (iv) grinding the kernel to obtain a ground kernel having a particle size smaller than 1 mm, wherein the puffed popcorn starch containing powder has a loose bulk density of less than 120 g/L, wherein more than 90 weight % of the puffed popcorn starch containing powder has a particle size smaller than 1 mm, wherein the puffed starch containing powder is puffed popcorn starch containing powder, and wherein the puffed popcorn starch containing powder has an oil retention capacity of at least 50% based upon the powder, and
   (b) Loading one or more non-aqueous liquid components into and/or onto the puffed popcorn starch containing powder by applying one or more non-aqueous liquid components to the starch containing powder under agitation to yield a non-aqueous liquid-loaded popcorn starch material.

7. The process of claim 6, further comprising adding flowing agents and/or anti-caking agents to the non-aqueous liquid-loaded popcorn starch material.

8. A gas-loaded starch material, comprising a solid carrier material consisting of a puffed popcorn starch containing powder according to claim 1 and one or more gaseous components absorbed into and/or onto said solid carrier material.

9. A method of applying the non-aqueous liquid-loaded starch material according to claim 4 in food and animal feed products, pharmaceuticals, nutraceuticals, agrochemicals, and cosmetic or personal care products.

10. The puffed starch containing powder or claim 1, wherein the puffed popcorn starch containing powder has an oil retention capacity of at least 75% based upon the powder.

11. The puffed starch containing powder or claim 6, wherein the puffed popcorn starch containing powder has an oil retention capacity of at least 75% based upon the powder.

* * * * *